United States Patent
Yu et al.

(10) Patent No.: US 10,444,741 B2
(45) Date of Patent: Oct. 15, 2019

(54) APPARATUS AND METHOD THEREOF FOR DETERMINING A CONTROL CONDITION SET OF A PRODUCTION LINE

(71) Applicant: Institute For Information Industry, Taipei (TW)

(72) Inventors: Cheng-Juei Yu, New Taipei (TW); Yi-Hsin Wu, New Taipei (TW); Yin-Jing Tien, Taipei (TW); Huan-Chi Peng, New Taipei (TW); Yu-Xuan Su, New Taipei (TW); Li-Jung Chen, Taipei (TW)

(73) Assignee: Institute For Information Industry, Taipei (TW)

( * ) Notice: Subject to any disclaimer, the term of this patent is extended or adjusted under 35 U.S.C. 154(b) by 18 days.

(21) Appl. No.: 15/985,976

(22) Filed: May 22, 2018

(65) Prior Publication Data
US 2019/0278257 A1    Sep. 12, 2019

(30) Foreign Application Priority Data
Mar. 12, 2018   (TW) .............................. 107108286 A

(51) Int. Cl.
G05B 19/418    (2006.01)
G06F 16/2457   (2019.01)

(52) U.S. Cl.
CPC . *G05B 19/41865* (2013.01); *G06F 16/24578* (2019.01); *G05B 2219/32015* (2013.01);
(Continued)

(58) Field of Classification Search
None
See application file for complete search history.

(56) References Cited

U.S. PATENT DOCUMENTS 8,549,012 B2 * 10/2013 Tsai ................. G05B 19/41865
707/748
2017/0351241 A1   12/2017 Bowers et al.
2018/0135243 A1   5/2018 Tsai et al.

FOREIGN PATENT DOCUMENTS

TW    I611314 B    1/2018

OTHER PUBLICATIONS

The extended European Search Report rendered by the European Patent Office (EPO) for the corresponding European patent application (No. 18173193.6), dated Jul. 24, 2018, 9 pages.
(Continued)

*Primary Examiner* — Ryan A Jarrett
(74) *Attorney, Agent, or Firm* — Skaar Ulbrich Macari, P.A.

(57) ABSTRACT

An apparatus and a method thereof for determining a control condition set of a production line. The apparatus divides several historical control condition sets into several groups, wherein the historical control conditions corresponding to the same control factor are the same in each group. For each group, the apparatus calculates a measurement of central tendency according to the historical yield related values in the group. The apparatus decides a subset of the groups. For each group in the subset, the apparatus calculates a degree of variation and a number regarding the different control conditions between the control condition set and the group. The apparatus calculates weight scores. Based on the measurements of central tendency and the weight scores, the apparatus selects one of the groups as a selected group and assigns the historical control conditions of the selected group as the control conditions of the control condition set.

18 Claims, 4 Drawing Sheets

(52) U.S. Cl.
 CPC .............. *G05B 2219/32196* (2013.01); *G05B 2219/32258* (2013.01)

(56) References Cited

OTHER PUBLICATIONS

"Prescriptive Analytics", https://en.wikipedia.org/w/index.php?title=Prescriptive_analytics&oldid=788797364, edited Jul. 3, 2017, retrieved Jul. 11, 2018, 8 pages.
"Prescriptive Analytics", https://web.archive.org/web/20170718231133/https://www.mathworks.com/discovery/prescriptive-analytics.html, retrieved Jul. 11, 2018, 3 pages.

\* cited by examiner

| Temperature | Pressure | Humidity | Yield |
|---|---|---|---|
| 25°C | 80 Pa | 55% | 60 |
| 25°C | 80 Pa | 55% | 62 |
| ⋮ | ⋮ | ⋮ | ⋮ |
| 30°C | 70 Pa | 55% | 80 |

FIG. 2A

| Temperature | Pressure | Humidity | Yield |
|---|---|---|---|
| 25°C | 100 Pa | 55% | 40 |

FIG. 2B

APPARATUS AND METHOD THEREOF FOR DETERMINING A CONTROL CONDITION SET OF A PRODUCTION LINE

PRIORITY

This application claims priority to Taiwan Patent Application No. 107108286 filed on Mar. 12, 2018, which is hereby incorporated by reference in its entirety.

FIELD

The present invention relates to an apparatus and a method thereof for determining a control condition set of a production line. Specifically, the present invention relates to an apparatus and a method thereof for determining a control condition set of a production line by using historical control condition sets.

BACKGROUND

For manufacturing industries, it is an important issue to decide actual control conditions (e.g., values, ranges, options, or the like) of control factors (e.g., temperature, pressure, humidity, or the like) for a production line to improve yield related values (e.g., improve the yield, reduce the cost, or the like).

When there is a need in manufacturing new products, the manufacturer must set a proper control condition for each control factor of the production line. Moreover, during the process of manufacturing the products, the manufacturer also needs to timely evaluate whether the current control conditions of the control factors need to be adjusted. A production line usually involves multiple control factors, and various control conditions corresponding to each of the control factors form complex control combinations, which makes the manufacturer hard to make a decision when setting the control conditions for the control factors. Currently, many manufacturers rely on the experiences of the experienced practitioners for setting the control conditions of the control factors. However, this approach extremely depends on the experiences and, moreover, the yield related values can only be improved after many times of adjustment for most cases.

Some manufacturers design an experimental method (e.g., a Taguchi method and a response surface method) and obtain an optimal control condition set (including the control conditions of all the control factors) after many experiments. However, applying the optimal control condition set to an on-site production line is usually infeasible. For example, the control conditions that can be set for the control factors of an on-site production line are often restricted in range, variation amount, and/or adjustability. If the control condition(s) corresponding to some control factor(s) in the optimal control condition set cannot meet the restriction, the optimal control condition set cannot be applied to the on-site production line.

Accordingly, it is an important task to efficiently determine and/or correct the control condition set (i.e., determine and/or correct the control conditions of the control factors) that can be actually applied to the production line so as to improve the yield related values and achieve the production target.

SUMMARY

In order to solve the aforementioned problems in determining control conditions of control factors of a production line, provided are an apparatus and a method thereof for determining a control condition set of a production line.

The apparatus for determining a control condition set of a production line in one example comprises a storage and a processor electrically connected with the storage. The storage stores a plurality of historical control condition sets, wherein each of the historical control condition sets comprises a historical yield related value and a plurality of historical control conditions corresponding to a plurality of control factors one-to-one. The processor divides the historical control condition sets into a plurality of groups, wherein the historical control conditions corresponding to the same control factor are the same in each of the groups. For each group, the processor calculates a measurement of central tendency of the group according to the historical yield related values of the historical control condition sets included in the group. The processor decides a subset of the groups. The processor performs the following operations on each of the groups included in the subset: (a) calculating a degree of variation according to the historical yield related values of the historical control condition sets included in the group, (b) calculating a number regarding different control conditions between the group and a preset control condition set, the preset control condition set comprising a plurality of preset control conditions corresponding to the control factors one-to-one, and (c) calculating a weight score according to the degree of variation, the number regarding different control conditions and a number of the control factors. The processor selects one of the groups included in the subset as a selected group according to the measurements of central tendency and the weight scores and assigns the historical control conditions of the selected group as a plurality of control conditions of the control condition set.

The method for determining a control condition set of a production line is adapted for use in an electrical apparatus. The method in one example comprises the following steps: (a) dividing a plurality of historical control condition sets into a plurality of groups, each of the historical control condition sets comprising a historical yield related value and a plurality of historical control conditions corresponding to a plurality of control factors one-to-one, the historical control conditions corresponding to the same control factor are the same in each of the groups, (b) calculating, for each group, a measurement of central tendency of the group according to the historical yield related values of the historical control condition sets included in the group; and (c) deciding a subset of the groups. The method further performs the following steps on each of the groups included in the subset: (d1) calculating a degree of variation of the historical yield related values of the historical control condition sets included in the group, (d2) calculating a number regarding different control conditions between the group and a preset control condition set, the preset control condition set comprises a plurality of preset control conditions corresponding to the control factors one-to-one, and (d3) calculating a weight score according to the degree of variation, the number regarding different control conditions and a number of the control factors. The method further selects one of the groups included in the subset as a selected group according to the measurements of central tendency and the weight scores and assigns the historical control conditions of the selected group as a plurality of control conditions of the control condition set.

A plurality of historical control condition sets are utilized to determine a control condition set that is going to be adopted by a production line. Briefly speaking, a plurality of historical control condition sets are divided into a plurality of groups and then a subset of the groups for subsequent analysis are decided. During the analysis, for each of the groups in the subset, the measurement of central tendency, the degree of variation, and the number regarding different control conditions are calculated with a preset control condition set and then the weight score is calculated. Thereafter, a suitable group is selected as a control condition set to be adopted according to the measurement of central tendency and the weight score. By using the historical control condition sets to evaluate the yield related values of various combinations that can be formed by various control conditions corresponding to a plurality of control factors, the technology provided herein can efficiently calculate values suitable for forming the control condition set. Therefore, comparing to the conventional techniques, the technology provided herein can obtain a suitable control condition set, does not require experienced practitioners to set the control conditions of the control factors based on their experiences, and, thereby, can reduce the cost caused by the trial process. Moreover, since the technology provided herein takes the number regarding different control conditions into consideration when determining the control conditions, overload of the production line caused by the number of the adjusted control factors at one time being excessive can also be avoided and, thereby, relevant cost can be avoided.

This summary overall describes the present invention (covers the problem to be solved, the means to solve the problem, and the effect of the present invention) to provide a basic understanding of the present invention. This summary is not intended to encompass all embodiments of the present invention. Additionally, this summary is neither intended to confirm essential or necessary elements of any or all embodiments of the present invention, nor intended to describe the scope of any or all embodiments of the present invention. This summary is provided only to present some concepts of part embodiments of the present invention in a simple form and as an introduction to the following detailed description.

BRIEF DESCRIPTION OF THE DRAWINGS

FIG. 2A is a schematic view depicting specific examples of historical control condition sets;

FIG. 2B is a schematic view depicting a specific example of a preset control condition set;

DETAILED DESCRIPTION

In the following description, an apparatus and a method thereof for determining a control condition set of a production line (i.e., determining a plurality of control conditions respectively corresponding to a plurality of control factors of the production line) will be explained with reference to certain example embodiments thereof. However, these example embodiments are not intended to limit the present invention to any specific examples, embodiments, environment, applications, or particular implementations described in these example embodiments. Therefore, description of these example embodiments is only for purpose of illustration rather than to limit the scope of the present invention. It shall be appreciated that, in the following embodiments and the attached drawings, elements unrelated to the present invention are omitted from depiction. In addition, dimensions of and dimensional relationships among individual elements in the attached drawings are provided only for illustration, but not to limit the scope of the present invention.

Figure 1:
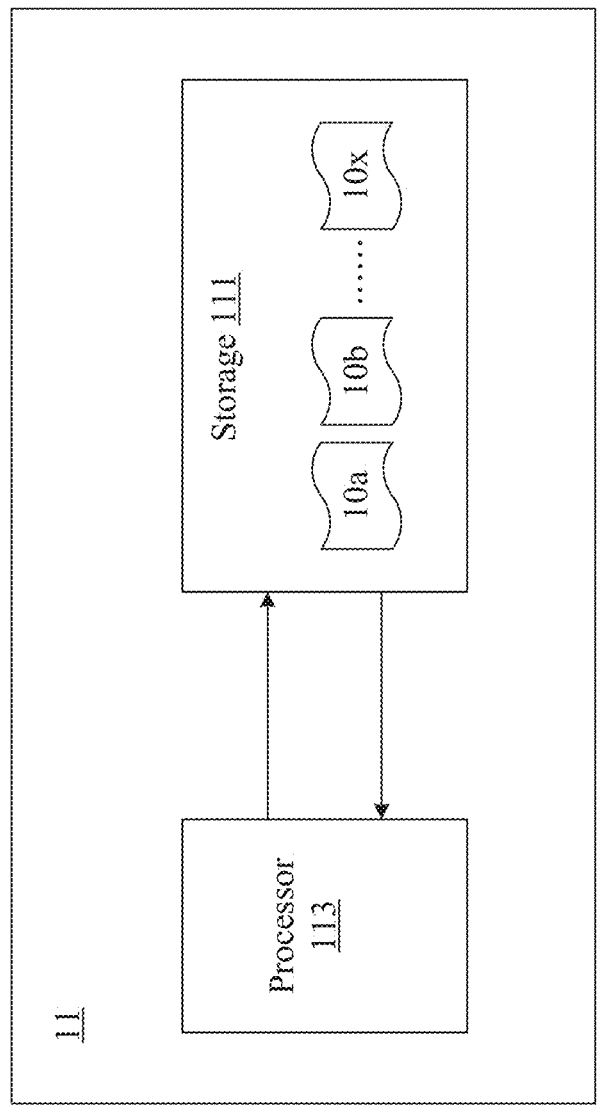
FIG. 1 is a schematic view depicting a determination apparatus 11 of a first embodiment.

A first embodiment of the present invention is an apparatus 11 for determining a control condition set of a production line (hereinafter referred to as "determination apparatus 11") and a schematic view thereof is depicted in FIG. 1. The determination apparatus 11 comprises a storage 111 and a processor 113, wherein they are electrically connected with each other. The storage 111 may be one of a memory, a universal serial bus (USB) disk, a hard disk, a compact disk (CD), a mobile disk, or any other storage media or circuits with the same function and well known to those of ordinary skill in the art. The processor 113 may be one of various processing units, central processing units (CPU), microprocessors, or other computing apparatuses well known to those of ordinary skill in the art.

Yield related values (e.g., yield, production efficiency, product yield, various production costs, production time, but not limited thereto) of a production line may serve as a standard for measuring the quality of the production line. Yield related values of a production line are influenced by control conditions (e.g., values, ranges, options, or the like, but not limited thereto) set for a plurality of control factors (e.g., temperature, humidity, pressure, but not limited thereto). For ease of description, the control conditions used for producing a batch of products by a production line may be called a control condition set.

In this embodiment, the storage 111 of the determination apparatus 11 stores a plurality of historical control condition sets $10a$, $10b$, ..., $10x$, and each of the historical control condition sets $10a$, $10b$, ..., $10x$ comprises a plurality of historical control conditions corresponding to the control factors of the production line one-to-one and a historical yield related value. For ease of understanding, please refer to a specific example shown in FIG. 2A, which, however, is not intended to limit the scope of the present invention. In this specific example, each of the historical control condition sets $10a$, $10b$, ..., $10x$ comprises three historical control conditions corresponding to three control factors (i.e., temperature, humidity, and pressure) of the production line one-to-one and a historical yield related value. For example, the historical control condition sets $10a$ comprises three historical control conditions (i.e., 25° C., 80 Pa, and 55%) corresponding to three control factors (i.e., temperature, humidity, and pressure) one-to-one and a historical yield related value (i.e., a yield of 60). For another example, the historical control condition sets $10x$ comprises three historical control conditions (i.e., 30° C., 70 Pa, and 55%) corresponding to three control factors (i.e., temperature, humidity, and pressure) one-to-one and a historical yield related value (i.e., a yield of 80).

It shall be appreciated that the historical control condition sets $10a$, $10b$, ..., $10x$ may be the values used by the same production line for producing products previously or may be values used by other production line(s) when producing the same type of products. The way to obtain the historical control condition sets is not limited in the present invention, and how to obtain the historical control condition sets is not the focus of the present invention and thus will not be further described herein.

In this embodiment, before a certain type of products are produced by a production line or during the process of producing a certain type of products by a production line, the determination apparatus 11 utilizes the historical control condition sets 10a, 10b, . . . , 10x (which were used previously for producing the same type of products) to determine a control condition set to be actually adopted by the production line to improve the yield related value. During the process of determining a control condition set to be actually adopted, the determination apparatus 11 will make reference to a preset control condition set. The preset control condition set comprises a plurality of preset control conditions corresponding to the control factors one-to-one and comprises a preset yield related value. It shall be appreciated that if the actual control condition set is determined before a certain type of products are produced by the production line, the preset control condition set may be any of the historical control condition sets 10a, 10b, . . . , 10x. If the actual control condition set is determined during the process of producing a certain type of products by the production line, the preset control condition set is a control condition set currently adopted by the production line.

Please refer to an exemplary preset control condition set S shown in FIG. 2B, which, however, is not intended to limit the scope of the present invention. The preset control condition set S comprises three preset control conditions (i.e., 25° C., 100 Pa, and 55%) corresponding to three control factors (i.e., temperature, humidity, and pressure) one-to-one and comprises a preset yield related value (i.e., a yield of 40).

It shall be appreciated that, in the present invention, each control condition of each control condition set may a specific value (e.g., 25° C. described previously), may be a range (e.g., ranging from 10° C. to 15° C.), or may be one of multiple options (e.g., when the control factor is a material and has options including metal, glass, and plastic, the control condition may be metal). It shall be additionally appreciated that the number and the type of the control factors as well as expressions of various control conditions are not limited in the present invention.

The focus of the present invention is to utilize the historical control condition sets 10a, 10b, . . . , 10x to determine the control condition set to be actually adopted by the production line in order to improve the yield related values. Hence, the following description will focus thereon.

The processor 113 of the determination apparatus 11 divides the historical control condition sets 10a, 10b, . . . , 10x into a plurality of groups according to the historical control conditions, wherein the division is to make the historical control conditions corresponding to the same control factor be the same in each of the groups. For ease of understanding, a specific example shown in FIG. 2A is described for illustration. For the historical control condition sets 10a and 10b, the historical control conditions thereof corresponding to the control factor "temperature" are the same (both of which are 25° C.), the historical control conditions thereof corresponding to the control factor "pressure" are the same (both of which are 80 Pa), and the historical control conditions thereof corresponding to the control factor "humidity" are the same (both of which are 55%), so the processor 13 designates the historical control condition sets 10a and 10b into the same group G.

Next, for each of the groups, the processor 113 calculates a measurement of central tendency of the group according to the historical yield related values of the historical control condition sets included in the group. For example, the measurement of central tendency may be a median, a mode, an arithmetic mean, or other index values that can represent the central tendency of the historical yield related values included in a group.

Additionally, the processor 113 decides a subset of the groups (i.e., selects some or all of the groups) for subsequent analysis. In some embodiments, the processor 113 decides the subset according to the measurement of central tendency of each of the groups. For example, the measurement of central tendency of each of the groups included in the subset decided by the processor 113 has to be greater than a threshold. The purpose of adopting such a strategy is to eliminate the groups whose historical yield related values are poorer. Furthermore, the processor 113 may set the threshold to be the preset yield related value of the preset control condition set (taking the preset control condition set S of FIG. 2 as an example, the preset yield related value is 40, so the threshold may be set to be 40), which means that the processor 113 only selects groups that can improve the preset yield related value of the preset control condition set for subsequent analysis.

In some embodiments, the processor 113 calculates a number of the historical control condition sets included in each of the groups and then decides the subset according to the number of the historical control condition sets included in each of the groups. For example, the number of the historical control condition sets in each of the groups included in the subset decided by the processor 113 has to be greater than a threshold number so as to eliminate the groups that has insufficient number of samples (i.e., the number of the historical control condition sets).

In some embodiments, the processor 113 may decide the subset according to both the measurement of central tendency of each of the groups and the number of the historical control condition sets in each of the groups. The detailed operations of those embodiments shall be appreciated by those of ordinary skill in the art based on the above description and, thus, will not be further described herein.

After deciding the subset of the groups, the processor 113 calculates a degree of variation for each of the groups included in the subset. Specifically, for each of the groups included in the subset, the processor 113 calculates a degree of variation of the historical yield related values of the historical control condition sets included in the group, e.g., a variance or other values that can be used to measure the degree of divergence of the historical yield related values of the group.

Additionally, for each of the groups included in the subset, the processor 113 calculates a number regarding different control conditions between the group and the preset control condition set according to the control factors. Specifically, the processor 113 calculates the number of the control factors whose historical control condition and the preset control condition are different. For ease of understanding, the preset control condition set S of FIG. 2B and the group G of FIG. 2A are taken as an example for illustration. In this example, the historical control condition and the preset control condition corresponding to the control factor "temperature" are the same (both of which are 25° C.), the historical control condition and the preset control condition corresponding to the control factor "humidity" are the same (both of which are 55%), and the historical control condition and the preset control condition corresponding to the control factor "pressure" are different, so the number regarding different control conditions is 1. In some embodiments, the processor 113 may represent the number regarding different control conditions by a Hamming distance.

It shall be appreciated that the present invention does not limit the order for calculating the degree of variation and the number regarding different control conditions. In other words, the processor 113 may decide the order of the calculation depending on needs.

Thereafter, for each of the groups included in the subset, the processor 113 calculates a weight score according to the degree of variation, the number regarding different control conditions, and a number of the control factors. For example, the processor 113 may calculate the weight score of each of the groups included in the subset according to the following formula:

$$WS_i = \frac{1}{variance_i / \text{Max}(variance)} \times \frac{FC - diff_i}{FC}$$

In the aforesaid formula, the parameter $WS_i$ represents the weight score of the $i^{th}$ group in the subset, the parameter $variance_i$ represents the degree of variation of the $i^{th}$ group, the parameter Max(variance) represents the maximum of the degrees of variation of the groups in the subset, the parameter FC represents the number of the control factors and the parameter $diff_i$ represents the number regarding different control conditions between the $i^{th}$ group and the preset control condition set. It shall be appreciated that if the degree of variation of a certain group is 0, the parameter $variance_i$ of the group may be replaced with the parameter Min(variance)×k, wherein the parameter Min(variance) represents the minimum of the degrees of variation of the groups in the subset, and the parameter k may be a fixed number ranging from 0 to 1. Moreover, it shall be appreciated that the purpose of adopting the aforesaid formula is to identify which groups are more stable (i.e., have a smaller degree of variation) and have a smaller number regarding different control conditions (i.e., the number of control factors that need to be adjusted is fewer). Therefore, the processor 113 may adopt other formulas that can identify groups which are more stable and have a smaller number regarding different control conditions.

Thereafter, the processor 113 selects one of the groups included in the subset as a selected group (e.g., selects the group whose sum of the measurement of central tendency and the weight score is the highest) according to the measurements of central tendency and the weight scores of the groups included in the subset and assigns the historical control conditions of the selected group as the control conditions to be actually adopted by the production line.

In some embodiments, the processor 113 may calculate a global rank according to the measurements of central tendency and the weight scores of the groups included in the subset and then select one of the groups included in the subset as the selected group according to the global rank. For example, the processor 113 may decide a weight rank of each of the groups included in the subset according to the weight scores of the groups included in the subset, decide a central tendency rank of each of the groups included in the subset according to the measurements of central tendency of the groups included in the subset, decide the global rank of each of the groups included in the subset according to the weight rank and the central tendency rank for each of the groups included in the subset, and select one (e.g., the top ranked one) of the groups included in the subset as the selected group according to the global rank.

In some embodiments, if each historical control condition set of each group included in the subset further comprises an index value, and each of the index values is associated with one of a production cost, a production time, a production yield, and a combination thereof, the processor 113 may utilize the measurements of central tendency, the weight scores, and the index values to calculate the global rank and then select one of the groups included in the subset as the selected group according to the global rank.

For example, the processor 113 calculates a group index value of each of the groups included in the subset according to the index values of the historical control condition sets of each of the groups included in subset. Additionally, the processor 113 may decide a weight rank of each of the groups included in the subset according to the weight scores of the groups included in the subset, decide a central tendency rank of each of the groups included in the subset according to the measurements of central tendency of the groups included in the subset, decide an index rank of each of the groups included in the subset according to the group index values of the groups included in the subset, decide a global rank of each of the groups included in the subset according to the weight rank, the central tendency rank, and the index rank for each of the groups included in the subset, and select one (e.g., the top ranked one) of the groups included in the subset as the selected group according to the global rank.

For example, the processor 113 may calculate the global rank of each of the groups by using the following formula:

$$GR_i = \frac{WR_i + MR_i + \sum_{j=1}^{N} IR_{ij}}{2 + N}$$

In the aforesaid formula, the parameter $GR_i$ represents the global rank of the $i^{th}$ group in the subset, the parameter $WR_i$ represents the weight rank of the $i^{th}$ group in the subset, the parameter $MR_i$ represents the central tendency rank of the $i^{th}$ group in the subset, the parameter $IR_{ij}$ represents the index rank of the $j^{th}$ type of index of the $i^{th}$ group in the subset, and the parameter N represents the number of types of the index values, wherein the parameter N is a positive integer.

In some embodiments, the processor 113 further calculates a number of the historical control condition sets included in each of the groups in the subset. In these embodiments, if the processor 113 determines that multiple groups among the groups included in the subset correspond to the highest global rank (i.e., multiple groups having the highest global ranks), the processor 113 selects the group having the highest global rank and a larger number of the historical control condition sets from the subset as the selected group.

After selecting a group from the subset as the selected group, the processor 113 assigns the historical control conditions of the selected group as a plurality of control conditions of the control condition set to be actually adopted by the production line. For example, the processor 113 may transmit a message to advise a manager of the production line to correct the preset control conditions to be consistent with the historical control conditions of the group, or directly correct the preset control conditions to be consistent with the historical control conditions of the group. For ease of understanding, FIG. 2A and FIG. 2B are taken as an example for illustration. If the processor 113 selects the group G from the subset as the selected group, only the control condition corresponding to the control factor "pressure" needs to be corrected to 80 Pa.

Figure 3:
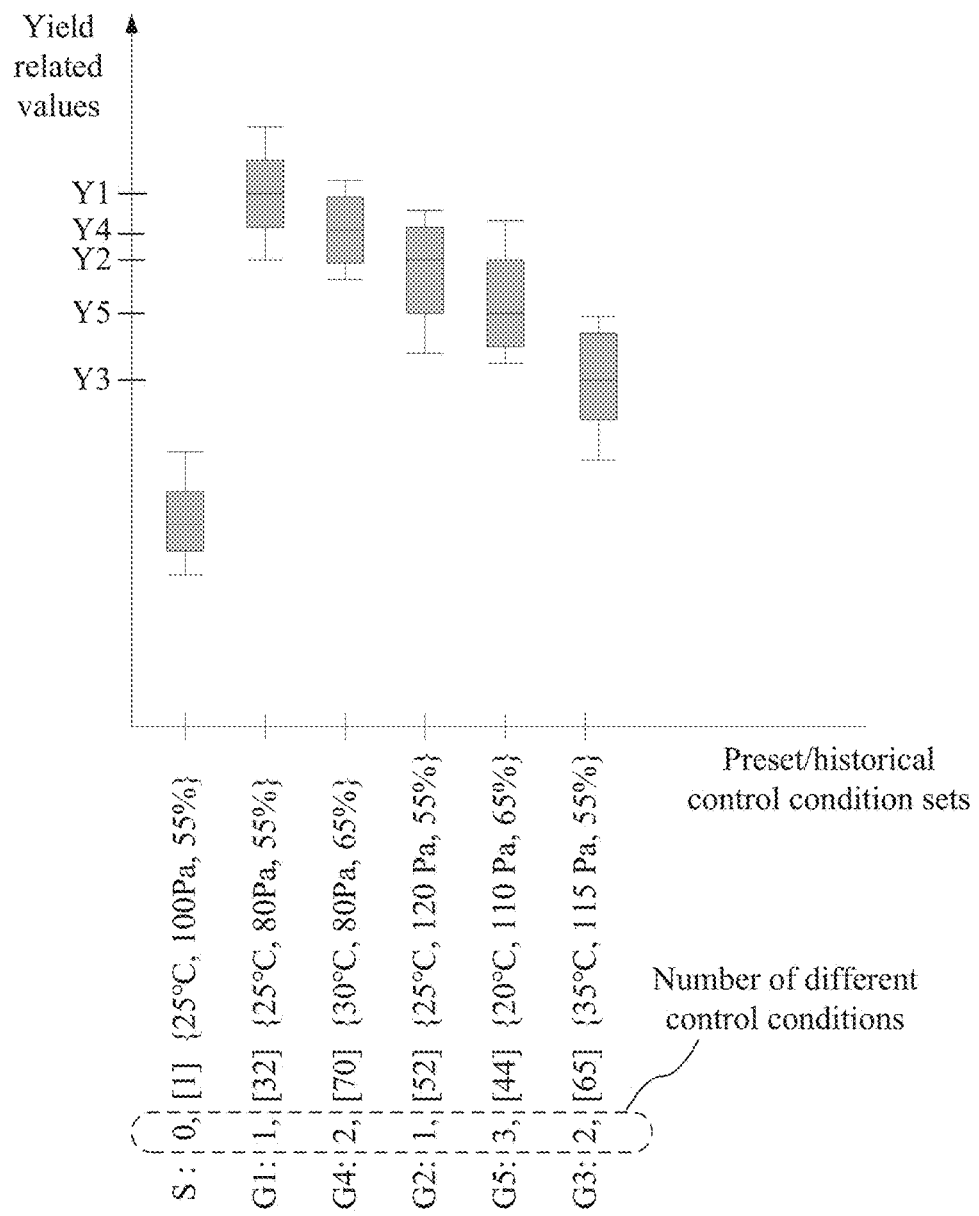
FIG. 3 is a schematic view depicting related values of groups by a boxplot.

In some embodiments, the determination apparatus 11 may further comprise a display (not shown) and the display is electrically connected to the processor 113. As shown in FIG. 3, in these embodiments, the display may display values related to the preset control condition set S and the measurement of central tendency, the degree of variation, and the number regarding different control conditions for each of the groups of the subset with a boxplot. For ease of understanding, a specific example of FIG. 3 is described for illustration, which, however, is not intended to limit the scope of the present invention. In this specific example, the subset decided by the processor 113 comprises groups G1, G2, G3, G4, and G5, each of the measurements of central tendency is a median, and each of the degrees of variation comprises a first quantile and a third quantile. In FIG. 3, the horizontal axis of the boxplot represents the preset control condition set S and the groups G1, G2, G3, G4 and G5 and the corresponding names, numbers regarding different control conditions, numbers of historical control condition sets (i.e., values in brackets), and preset/historical control conditions (i.e., information in braces) thereof are shown. The processor 113 may sort the groups G1, G2, G3, G4 and G5 according to the measurements of central tendency Y1, Y2, Y3, Y4 and Y5 and the display may then present the measurement of central tendency and the degree of variation of each of the groups according to the sorting result (the group of a larger measurement of central tendency is closer to the left). The manager of the production line can learn the measurement of central tendency, the degree of variation, and the number regarding different control conditions of each of the groups G1 to G5 in the subset according to the boxplot displayed on the display, decide which group to be selected as a selected group, and then assign the historical control conditions of the selected group as a plurality of control conditions of the control condition set to be actually adopted by the production line.

From the above descriptions, the determination apparatus 11 utilizes the historical control condition sets 10a, 10b, . . . , 10x to decide a plurality of control conditions of the control condition set to be actually adopted by the production line. Briefly speaking, the determination apparatus 11 divides the historical control condition sets 10a, 10b, . . . , 10x into a plurality of groups and then decides a subset of the groups for subsequent analysis. For each of the groups in the subset, the determination apparatus 11 calculates the measurement of central tendency, the degree of variation, and the number regarding different control conditions between the group and the preset control condition set and then calculates the weight score during the analysis. Finally, the determination apparatus 11 selects a suitable group as a control condition set to be actually adopted by the production line according to the measurement of central tendency and the weight score and even according to other index values.

By using the historical control condition sets 10a, 10b, . . . , 10x to evaluate the yield related values of various combinations that can be formed by the control conditions corresponding to the control factors, the determination apparatus 11 can efficiently calculate values suitable for forming the control condition set of the production line. Therefore, comparing to the conventional techniques, the present invention can obtain a suitable control condition set, does not require experienced practitioners to set the control conditions of the control factors based on their experiences, and, thereby, can reduce the cost caused by the trial process. Moreover, since the determination apparatus 11 takes the number regarding different control conditions into consideration when determining the control condition set, overload of the production line caused by the number of the adjusted control factors at one time being excessive can also be avoided and, thereby, relevant cost can be avoided.

Figure 4:
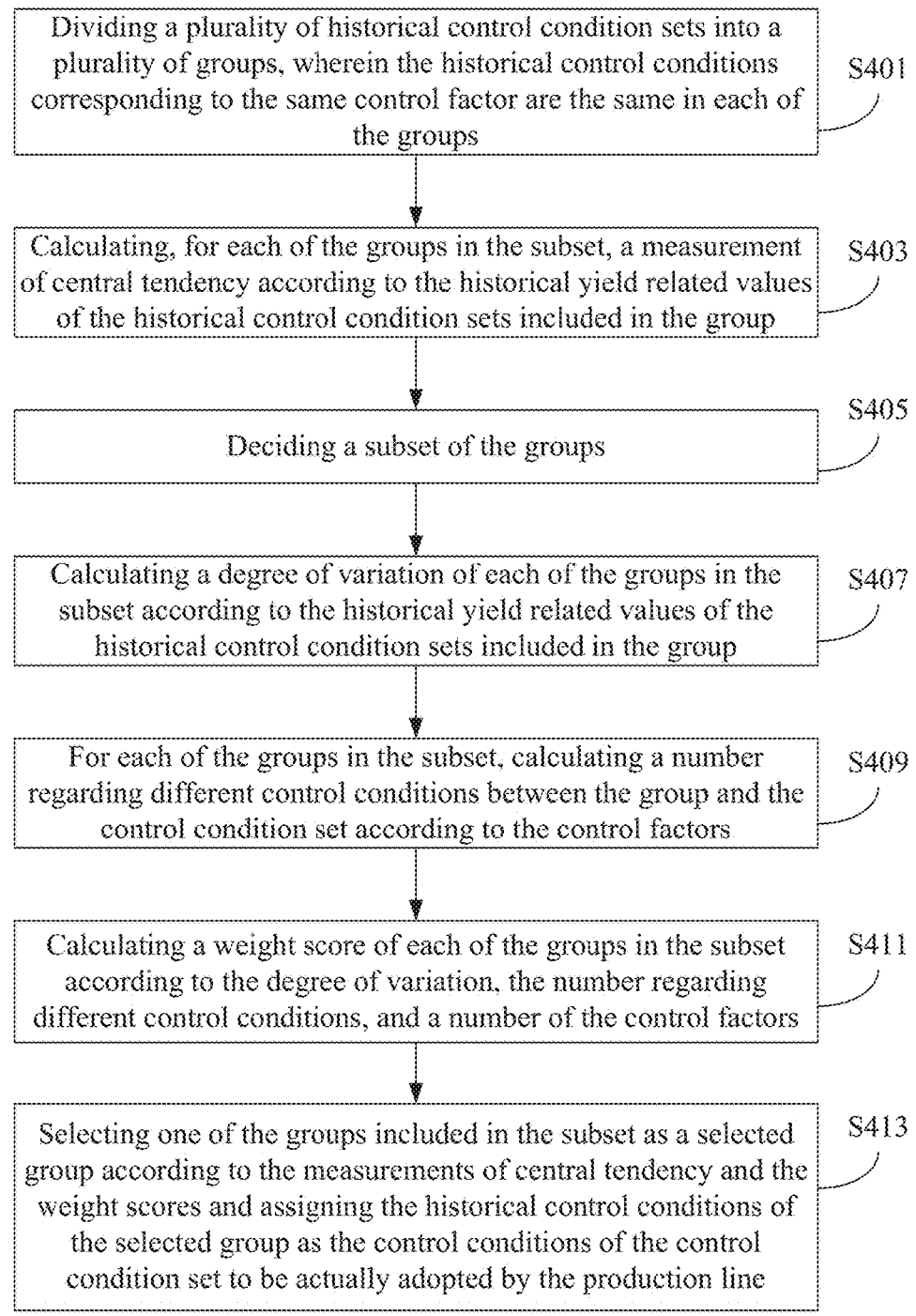
FIG. 4 is a flowchart depicting a determination method of a second embodiment.

A second embodiment of the present invention is a method for determining a control condition set of a production line (hereinafter referred to as "determination method") and a flowchart thereof is depicted in FIG. 4. The determination method is adapted for use in an electronic apparatus, e.g., the determination apparatus 11 described in the first embodiment.

In this embodiment, the electronic apparatus stores a plurality of historical control condition sets, wherein each of the historical control condition sets comprises a historical yield related value and a plurality of historical control conditions corresponding to a plurality of control factors of the production line one-to-one.

In this embodiment, during the process of determining a control condition set to be actually adopted by the production line, the determination method refers to a preset control condition set. The preset control condition set comprises a plurality of preset control conditions corresponding to the control factors one-to-one and comprises a preset yield related value. It shall be appreciated that if the actual control condition set is determined before a certain type of products are produced by the production line, the preset control condition set may be any of the historical control condition sets. If the actual control condition set is determined during the process of producing a certain type of products by the production line, the preset control condition set is a control condition set currently adopted by the production line.

First, step S401 is executed by the electronic apparatus to divide the historical control condition sets into a plurality of groups, wherein the historical control conditions corresponding to the same control factor are the same in each of the groups. Next, step S403 is executed by the electronic apparatus to calculate, for each of the groups, a measurement of central tendency of the group according to the historical yield related values of the historical control condition sets included in the group. Additionally, step S405 is executed to decide a subset of the groups by the electronic apparatus. For example, the measurement of central tendency of each of the groups included in the subset decided by the step S405 is greater than a threshold. For another example, the determination method may enable the electronic apparatus to execute another step to calculate a number of the historical control condition sets included in each of the groups and then execute the step S405, wherein the number of the historical control condition sets in each of the groups included in the subset decided in the step S405 is greater than a threshold number.

Thereafter, step S407 is executed by the electronic apparatus to calculate a degree of variation of each of the groups in the subset according to the historical yield related values of the historical control condition sets included in the group. Furthermore, in step S409, for each of the groups in the subset, the electronic apparatus calculates a number regarding different control conditions between the group and the preset control condition set according to the control factors. It shall be appreciated that the order to execute the step S407 and the step S409 is not limited in the present invention. Thereafter, in step S411, the electronic apparatus calculates a weight score of each of the groups in the subset according to the degree of variation, the number regarding different control conditions, and a number of the control factors.

Then, step S413 is executed by the electronic apparatus to select one of the groups included in the subset as a selected group according to the measurements of central tendency and the weight scores and assign the historical control conditions of the selected group as the control conditions of the control condition set to be actually adopted by the production line.

In some embodiments, the step S413 selects one of the groups included in the subset as the selected group by the following steps: deciding a weight rank of each of the groups included in the subset according to the weight scores of the groups included in the subset, deciding a central tendency rank of each of the groups included in the subset according to the measurements of central tendency of the groups included in the subset, deciding a global rank of each of the groups included in the subset according to the weight rank and the central tendency rank for each of the groups included in the subset, and selecting one of the groups included in the subset as the selected group according to the global rank.

In some embodiments, each historical control condition set of each group included in the subset has an index value, and each of the index values may be associated with one of a production cost, a production time, a production yield, and a combination thereof. The determination method further executes a step to enable the electronic apparatus to calculate a group index value of each of the groups included in the subset according to the index values of the historical control condition sets of each of the groups included in subset. For those embodiments, the step S413 selects one of the groups included in the subset as the selected group by the following steps: deciding a weight rank of each of the groups included in the subset according to the weight scores of the groups included in the subset, deciding a central tendency rank of each of the groups included in the subset according to the measurements of central tendency of the groups included in the subset, deciding an index rank of each of the groups included in the subset according to the group index values of the groups included in the subset, deciding a global rank of each of the groups included in the subset according to the weight rank, the central tendency rank, and the index rank for each of the groups included in the subset, and selecting one of the groups included in the subset as the selected group according to the global rank.

In some embodiments, the determination method further enables the electronic apparatus to execute a step to calculate a number of the historical control condition sets included in each of the groups. For those embodiments, if the determination method determines that multiple groups among the groups included in the subset correspond to the highest global rank, the step S413 selects the group having the highest global rank and a larger number of historical control condition sets from the subset as the selected group.

In addition to the aforesaid steps, the second embodiment can also execute all the operations and steps of the determination apparatus 11 set forth in the first embodiment, have the same functions, and deliver the same technical effects as the first embodiment. How the second embodiment executes these operations and steps, has the same functions, and delivers the same technical effects as the first embodiment will be readily appreciated by those of ordinary skill in the art based on the explanation of the first embodiment, and thus will not be further described herein.

According to the above descriptions, the present invention utilizes a plurality of historical control condition sets to determine the control condition set to be actually adopted by the production line. Briefly speaking, the present invention divides a plurality of historical control condition sets into a plurality of groups and then decides a subset of the groups for subsequent analysis. For each of the groups in the subset, the present invention calculates the measurement of central tendency, the degree of variation, and the number regarding different control conditions between the group and the preset control condition set and then calculates the weight score during the analysis. Finally, the present invention selects a group suitable as a control condition set to be actually adopted by the production line according to the measurement of central tendency and the weight score and even according to other additional index values.

By using the historical control condition sets to evaluate the yield related values of various combinations that can be formed by the control conditions corresponding to the control factors, the technology provided by the present invention can efficiently calculate values suitable to be used as the control condition set. Therefore, comparing to conventional techniques, the present invention can obtain a suitable control condition set, does not require experienced practitioners to set the control conditions of the control factors based on their experiences, and, thereby, can reduce the cost caused by the trial process. Moreover, since the present invention takes the number regarding different control conditions into consideration when determining the control condition set, overload of the production line caused by the number of the adjusted control factors at one time being excessive can also be avoided and, thereby, relevant cost can be avoided.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An apparatus for determining a control condition set of a production line, comprising:
  a storage, storing a plurality of historical control condition sets, each of the historical control condition sets comprising a historical yield related value and a plurality of historical control conditions corresponding to a plurality of control factors one-to-one; and
  a processor, being electrically connected to the storage and configured to divide the historical control condition sets into a plurality of groups, the historical control conditions corresponding to the same control factor are the same in each of the groups,
  wherein for each group, the processor calculates a measurement of central tendency according to the historical yield related values included in the group,
  wherein the processor decides a subset of the groups and performs the following operations on each of the groups included in the subset: (a) calculating a degree of variation of the historical yield related values of the historical control condition sets included in the group, (b) calculating a number regarding different control conditions between the group and a preset control condition set, the preset control condition set comprising a plurality of preset control conditions corresponding to the control factors one-to-one, and (c) calculating a weight score according to the degree of variation, the number regarding different control conditions, and a number of the control factors,
  wherein the processor selects one of the groups included in the subset as a selected group according to the measurements of central tendency and the weight scores and assigns the historical control conditions of the selected group as a plurality of control conditions of the control condition set.

2. The apparatus of claim 1, wherein the processor further calculates a number of the historical control condition sets included in each of the groups, and the number of the historical control condition sets in each of the groups included in the subset decided by the processor is greater than a threshold number.

3. The apparatus of claim 1, wherein the measurement of central tendency of each of the groups included in the subset decided by the processor is greater than a threshold.

4. The apparatus of claim 1, wherein the processor selects one of the groups included in the subset as the selected group by the following operations:
deciding a weight rank of each of the groups included in the subset according to the weight scores of the groups included in the subset;
deciding a central tendency rank of each of the groups included in the subset according to the measurements of central tendency of the groups included in the subset;
deciding a global rank of each of the groups included in the subset according to the weight rank and the central tendency rank for each of the groups included in the subset; and
selecting one of the groups included in the subset as the selected group according to the global rank.

5. The apparatus of claim 4, wherein the processor further calculates a number of the historical control condition sets included in each of the groups, the processor further determines that multiple groups among the groups included in the subset correspond to the highest global rank, and the processor selects the group having the highest global rank and a larger number of historical control condition sets from the subset as the selected group.

6. The apparatus of claim 1, wherein each of the historical control condition sets of each of the groups included in the subset has an index value, the processor further calculates a group index value of each of the groups included in the subset according to the index values of the historical control condition sets of each of the groups included in subset, and the processor selects one of the groups included in the subset as the selected group by the following operations:
deciding a weight rank of each of the groups included in the subset according to the weight scores of the groups included in the subset;
deciding a central tendency rank of each of the groups included in the subset according to the measurements of central tendency of the groups included in the subset;
deciding an index rank of each of the groups included in the subset according to the group index values of the groups included in the subset;
deciding a global rank of each of the groups included in the subset according to the weight rank, the central tendency rank and the index rank for each of the groups included in the subset; and
selecting one of the groups included in the subset as the selected group according to the global rank.

7. The apparatus of claim 6, wherein each of the index values is associated with one of a production cost, a production time, a production yield, and a combination thereof.

8. The apparatus of claim 6, wherein the processor further calculates a number of the historical control condition sets included in each of the groups, the processor further determines that multiple groups among the groups included in the subset correspond to the highest global rank, and the processor selects the group having the highest global rank and a larger number of historical control condition sets from the subset as the selected group.

9. The apparatus of claim 1, further comprising:
a display, being electrically connected to the processor and configured to display the measurement of central tendency, the degree of variation, and the number regarding different control conditions of each of the groups included in the subset with a boxplot.

10. A method for determining a control condition set of a production line, being adapted for use in an electrical apparatus, the method comprising:
(a) dividing a plurality of historical control condition sets into a plurality of groups, each of the historical control condition sets comprising a historical yield related value and a plurality of historical control conditions corresponding to a plurality of control factors one-to-one, and the historical control conditions corresponding to the same control factor are the same in each of the groups;
(b) calculating, for each group, a measurement of central tendency according to the historical yield related values included in the group;
(c) deciding a subset of the groups;
(d) performing the following steps on each of the groups included in the subset:
(d1) calculating a degree of variation of the historical yield related values of the historical control condition sets included in the group;
(d2) calculating a number regarding different control conditions between the group and a preset control condition set, the preset control condition set comprising a plurality of preset control conditions corresponding to the control factors one-to-one; and
(d3) calculating a weight score according to the degree of variation, the number regarding different control conditions, and a number of the control factors, and
(e) selecting one of the groups included in the subset as a selected group according to the measurements of central tendency and the weight scores and assigning the historical control conditions of the selected group as a plurality of control conditions of the control condition set.

11. The method of claim 10, further comprising:
calculating a number of the historical control condition sets included in each of the groups;
wherein the number of the historical control condition sets in each of the groups included in the subset decided in the step (c) is greater than a threshold number.

12. The method of claim 10, wherein the measurement of central tendency of each of the groups included in the subset decided by the step (c) is greater than a threshold.

13. The method of claim 10, wherein the step (e) selects one of the groups included in the subset as the selected group by steps including:
deciding a weight rank of each of the groups included in the subset according to the weight scores of the groups included in the subset;
deciding a central tendency rank of each of the groups included in the subset according to the measurements of central tendency of the groups included in the subset;
deciding a global rank of each of the groups included in the subset according to the weight rank and the central tendency rank for each of the groups included in the subset; and
selecting one of the groups included in the subset as the selected group according to the global rank.

14. The method of claim 13, further comprising:

calculating a number of the historical control condition sets included in each of the groups; and determining that multiple groups among the groups included in the subset correspond to the highest global rank;

wherein the step (e) selects the group having the highest global rank and a larger number of historical control condition sets from the subset as the selected group.

15. The method of claim 10, wherein each of the historical control condition sets of each of the groups included in the subset has an index value, and the method further comprises:

calculating a group index value of each of the groups included in the subset according to the index values of the historical control condition sets of each of the groups included in subset;

wherein the step (e) selects one of the groups included in the subset as the selected group by the following steps:

deciding a weight rank of each of the groups included in the subset according to the weight scores of the groups included in the subset;

deciding a central tendency rank of each of the groups included in the subset according to the measurements of central tendency of the groups included in the subset;

deciding an index rank of each of the groups included in the subset according to the group index values of the groups included in the subset;

deciding a global rank of each of the groups included in the subset according to the weight rank, the central tendency rank and the index rank for each of the groups included in the subset; and selecting one of the groups included in the subset as the selected group according to the global rank.

16. The method of claim 15, wherein each of the index values is associated with one of a production cost, a production time, a production yield, and a combination thereof.

17. The method of claim 15, further comprising:

calculating a number of the historical control condition sets included in each of the groups; and determining that multiple groups among the groups included in the subset correspond to the highest global rank;

wherein the step (e) selects the group having the highest global rank and a larger number of historical control condition sets from the subset as the selected group.

18. The method of claim 10, further comprising:

displaying the measurement of central tendency, the degree of variation, and the number regarding different control conditions of each of the groups included in the subset with a boxplot.

* * * * *